May 19, 1936.  G. A. GLEASON  2,040,987
END FITTING FOR AUTOMOBILE BRAKE CONTROLS
Filed Sept. 27, 1934
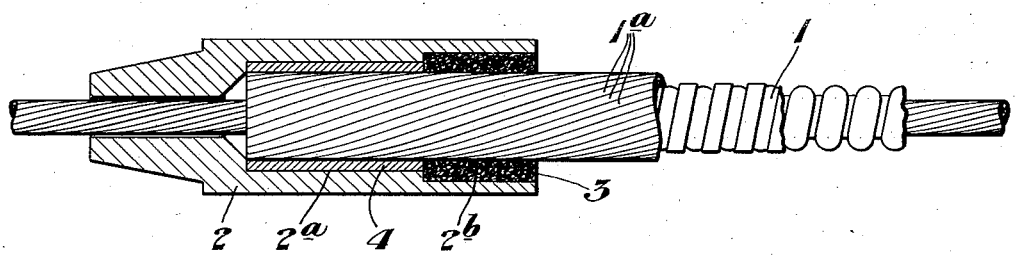
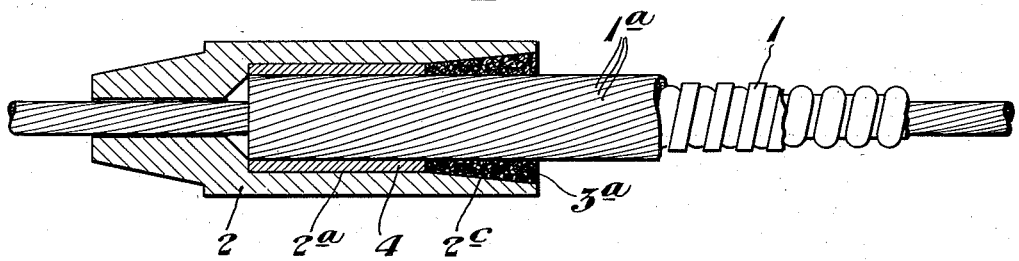
Inventor:
GEORGE A. GLEASON,
by Usina & Rauber
his Attorneys.

UNITED STATES PATENT OFFICE 2,040,987

END FITTING FOR AUTOMOBILE BRAKE CONTROLS

George A. Gleason, Worcester, Mass., assignor to The American Steel and Wire Company of New Jersey, a corporation of New Jersey Application September 27, 1934, Serial No. 745,798

2 Claims. (Cl. 285—72)

This invention relates to flexible conduits which carry control cables packed in grease, one of the objects being to provide an improved end construction for such a conduit.

In the accompanying drawing Figure 1 is a longitudinal section of an example of the invention and Figure 2 is a similar view of a modification.

Figure 1 shows the combination of a flexible conduit 1 having an outside constructed of stranded wires 1a, a fitting 2 having a bore 2a receiving an end portion of the conduit 1 and a counterbore 2b providing an annular space around the latter spaced and facing away from its extreme end, and a relatively soft gasket 3 arranged in the counterbore 2b under sufficient compression to cause it to enter and close the outer interstices between the stranded wires 1a. The combination also includes a soft metal sleeve 4 press-fitted to the portion of the conduit 1 received by the bore 2a, the fitting 2 being swaged into firm engagement with this sleeve.

The above combination is particularly suited for incorporation in automobile brake control systems, since the sleeve and gasket arrangement prevents leakage of grease forced into the conduit under pressure, while the gasket absorbs or dampens the destructive localization of vibration at this point and provides a flexible and yielding material which prevents kinking of the conduit at the fitting.

It is believed that the sleeve may best be made of soft steel. The gasket may be made of leather, rubber, fiber composition, etc.

Figure 2 shows a combination that is similar to the one already described excepting that the fitting 2 has a counterbore 2c providing an outwardly flaring annular space around the conduit, and a conical gasket 3a, which fits this space, is used.

I claim:

1. The combination of a flexible conduit having an outside constructed of stranded wires, a fitting having a bore receiving an end portion of said conduit and a counterbore providing an outwardly flaring annular space around the outside of the latter spaced from its extreme end, and a relatively soft gasket filling said counterbore and being under sufficient compression to cause it to enter and close the outer interstices between said stranded wires, said conduit having a soft metal sleeve press-fitted to its portion received by said bore and said fitting being swaged into firm engagement with said sleeve.

2. The combination of a flexible conduit having an outside constructed of stranded wires, a fitting having a bore receiving an end portion of said conduit and a counterbore providing an annular space around the outside of the latter spaced from its extreme end, and a relatively soft gasket filling said counterbore and being under sufficient compression to cause it to enter and close the outer interstices between said stranded wires, said conduit having a soft metal sleeve press-fitted to its portion received by said bore and said fitting being swaged into firm engagement with said sleeve.

GEORGE A. GLEASON.